United States Patent [19]

Lapierre et al.

[11] Patent Number: 4,806,294

[45] Date of Patent: Feb. 21, 1989

[54] METHOD OF MAKING A FOAM INJECTION MOLDED ARTICLE

[75] Inventors: Robert M. Lapierre, Sterling; Nicholas J. Leonardi, North Andover, both of Mass.

[73] Assignee: Enron Chemical Company, Cincinnati, Ohio

[21] Appl. No.: 207,125

[22] Filed: Jun. 15, 1988

Related U.S. Application Data

[62] Division of Ser. No. 908,625, Sep. 18, 1986, Pat. No. 4,769,397.

[51] Int. Cl.$^4$ .............................. C08J 9/06; C08J 9/08
[52] U.S. Cl. ................................ 264/54; 264/DIG. 5; 264/DIG. 83; 264/337; 521/85; 521/92; 521/97; 521/76; 521/143; 521/146
[58] Field of Search .......... 264/54, DIG. 5, DIG. 83, 264/337; 521/85, 76, 92, 97, 143, 146

[56] References Cited

U.S. PATENT DOCUMENTS

| | | | |
|---|---|---|---|
| 2,941,964 | 6/1960 | Houston et al. | 521/82 |
| 3,185,588 | 5/1965 | Resnick | 117/100 |
| 4,383,048 | 5/1983 | Hall et al. | 521/85 |
| 4,394,458 | 7/1983 | Wade | 521/82 |
| 4,397,948 | 8/1983 | Wade | 521/82 |
| 4,399,238 | 8/1983 | Wade | 521/82 |
| 4,403,045 | 9/1983 | Wade | 521/82 |
| 4,413,065 | 11/1983 | Hall et al. | 521/82 |
| 4,431,752 | 2/1984 | Oswitch | 521/85 |
| 4,520,137 | 5/1985 | Hamel et al. | 521/85 |
| 4,588,754 | 5/1986 | Liu | 521/92 |
| 4,650,816 | 3/1987 | Bertrand | 521/85 |

OTHER PUBLICATIONS

Gribens and Rei:, "Sodium Borohydride—A Novel Blowing Agent For Structural Foams", *Plastics Engineering*, vol. 38, No. 3, Mar. 19.
"Hydrocerol—A Chemical Blowing Agent"—Product Literature, author and date unknown.
"Hydrocerol, Hydrocerol-Compound, Hydrocerol-CLM70"—Product Literature—Boehringer Ingelheim, author and date unknown.
*Plastics Engineering Handbook*—4th Ed.—Ed. by Joel Frades, 1976, p. 847.
"Process Stream Purification with Sodium Borohydride—Technical Manual and User's Guide"—Morton Thiokol, Inc., Ventron Division, author and date unknown.
"Production of Foamed Thermo-plastics with Hydrocerol CF"—Product Literature—Boehringer Ingelheim, author and date unknown.
"Production of Foamed Thermo-plastics with Hydrocerol-Compound and Hydrocerol Batches"—Product Literature—Boehringer Ingelheim, author and date unknown.

*Primary Examiner*—Morton Foelak
*Attorney, Agent, or Firm*—Marshall, O'Toole, Gerstein, Murray & Bicknell

[57] ABSTRACT

A method of making a foam injection molded article is disclosed wherein corrosion of the mold element is significantly reduced or substantially eliminated. The method comprises dispersing effective amounts of a primary chemical blowing agent of sodium borohydride and an activation system of sodium bicarbonate/citric acid mix into a polymer resin to form a mixture. The mixture is then heated whereby the activation system releases water and the sodium borohydride reacts with the water to produce hydrogen gas. The mixture is subsequently injected into a mold to obtain expansion of the polymer resin to form the foam article. The invention also comprehends a corresponding chemical blowing agent composition.

28 Claims, No Drawings

METHOD OF MAKING A FOAM INJECTION MOLDED ARTICLE

CROSS-REFERENCE TO RELATED APPLICATION

This application is a division of copending, commonly assigned application Ser. No. 908,625 filed Sept. 18, 1986, now U.S. Pat. No. 4,769,397 issued Sept. 6, 1988.

BACKGROUND OF THE INVENTION

1. Field of the Invention

This invention relates generally to foam products and, more particularly, this invention relates to chemical blowing agent composition and method of making molded foam articles.

2. Description of Related Art

Blowing agents are commonly used either alone or in combination with other substances to produce a cellular structure in a plastic mass. Generally, blowing agents may be classified either as "physical blowing agents" or "chemical blowing agents". Physical blowing agents are generally those materials which are gaseous at temperatures below the processing temperature, i.e., the temperature at which the plastic mass is to be expanded. Chemical blowing agents generally refer to those compositions which decompose or react under the influence of heat to form a gas. Chemical blowing agents range from simple salts such as ammonium or sodium bicarbonate to complex nitrogen-releasing compounds. Chemical blowing agent "concentrates" refer to those compositions and/or components of compositions which are encapsulated in a carrier resin in a high ratio relative to the carrier resin.

Desirable properties of a chemical blowing agent include:

(a) narrow gas-release temperature range,
(b) controllable but rapid gas release rate,
(c) non-corrosive reaction products,
(d) stability in storage, and
(e) reaction products and residue that are compatible with the material to be foamed and have little or no detrimental effect on its properties.

Endothermic chemical blowing agents such as mixtures of sodium bicarbonate and citric acid are gaining in popularity for foaming thermoplastics because of properties such as: fast degassing times, improved cell structure and endothermic decomposition. However, such sodium bicarbonate and citric acid mixes evolve water upon decomposition which then acts in combination with the unreacted citric acid, often resulting in pitting, rusting and general corrosion of the steel tooling commonly used in injection molding.

Sodium borohydride has found favor as a chemical blowing agent because of its high gas pressure, non-discoloration of resin to be foamed and non-plating properties. Sodium borohydride, however, requires water or some other proton donor to react with in order to release gas for foaming. Activators based on present technology have not been consistent when used in conventional thermoplastic processes. The effectiveness of known activators, such as aluminum trihydrate and organic acids, (see Hall et al, U.S. Pat. No. 4,413,065) are often dependent upon the type of resin and equipment used. Further, aluminum trihydrate must be heated to a temperature greater than 450° F. to release water to activate sodium borohydride concentrate and many acid activators volatize at a temperature sufficiently near ambient temperature that they are difficult to handle and/or store.

Other hydrated compounds have also been evaluated as chemical blowing agents but these compounds generally suffer from releasing water at so low a temperature that a concentrate of the material cannot be made.

SUMMARY OF THE INVENTION

It is an object of the invention to overcome one or more of the problems described above.

According to the invention, a method of making a foam injection molded article is provided. The method includes dispersing an effective amount of a primary chemical blowing agent comprising sodium borohydride and an activation system comprising a sodium bicarbonate/citric acid mix comprising effective amounts of sodium bicarbonate and citric acid into a polymer resin to form a mixture. The mixture is then heated whereby the activation system releases water and the sodium borohydride reacts with the water to produce hydrogen gas. Subsequently, the mixture is injected into a mold to obtain expansion of the polymer resin into a molded foam article.

In addition, the invention comprehends a chemical blowing agent composition.

Other objects and advantages of the invention will be apparent to those skilled in the art from the following detailed description taking in conjunction with the appended claims.

DETAILED DESCRIPTION OF THE INVENTION

According to the invention, chemical blowing agent compositions and methods of making foam injection molded articles are provided.

The invention contemplates a method of making a foam injection molded article wherein a primary chemical blowing agent comprising sodium borohydride and an activation system comprising a sodium bicarbonate/citric acid mix are dispersed into a polymer resin to form a mixture.

In a preferred method of the invention, the sodium borohydride and the sodium bicarbonate/citric acid mix are each encapsulated with a carrier resin to form pellets. A chemical blowing agent mixture of the sodium borohydride pellets and the sodium bicarbonate/citric acid mix pellets is then prepared. The pellets of this chemical blowing agent mixture are then fed to an injection molding machine along with the polymer resin to be foamed. The polymer resin is melted as it is fed into the barrel of the molding machine and is mixed with the chemical blowing agent mixture pellets. The heating of the mixture results in the sodium bicarbonate reacting with the citric acid to release water, as follows:

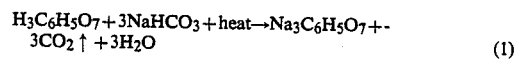

$$H_3C_6H_5O_7 + 3NaHCO_3 + \text{heat} \rightarrow Na_3C_6H_5O_7 + 3CO_2\uparrow + 3H_2O \quad (1)$$

The sodium borohydride, in turn, reacts with the water produced as a result of the reaction of the sodium bicarbonate and citric acid to produce hydrogen gas:

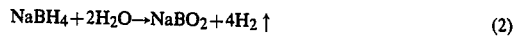

$$NaBH_4 + 2H_2O \rightarrow NaBO_2 + 4H_2\uparrow \quad (2)$$

Thus, the overall reaction resulting from the use of this chemical blowing agent composition may be derived by combining reactions (1) and (2), as follows:

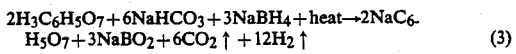
(3)

As is evidenced by these reactions, the chemical blowing agent mixture results in the release of gas, i.e., carbon dioxide gas in the case of reaction (1) and hydrogen gas in the case of reaction (2). However, at this point in the injection molding process the plastic mass is under sufficient pressure, e.g., 500–1,000 psi, to prevent expansion and foaming of the polymer material. Subsequently, however, the mixture is injected into a nonpressurized mold whereupon expansion of the polymer resin is obtained to form a molded foam article. The foam material is then held in the mold and permitted to cool.

In using the chemical blowing agent composition of the invention, it is important that the sodium borohydride not directly contact the sodium bicarbonate/citric acid mix until meltdown. Such isolation of the reactive components is required because the water generated by means of the reaction between sodium bicarbonate and citric acid (see reaction (1) above) serves as a proton donor which reacts with the sodium borohydride to release hydrogen gas for foaming. This isolation of the reactive components of a composition can be effected by means that are obvious to those skilled in the art. For example, the sodium borohydride and the sodium bicarbonate/citric acid mix components may each be fed to the injection molding machine by means of separate feed systems so as to avoid direct contact until desired.

A preferred method by which isolation of the components may be effected until direct contact is desired is through the use of resin encapsulated pellets of each of the components, i.e., the sodium borohydride and the bicarbonate/citric acid mix. Typically, this is done by encapsulating each component in a polymer carrier resin.

For example, encapsulation of the components may be effected by feeding a polymer carrier resin and a powdered sodium borohydride or sodium bicarbonate/citric acid mix, respectively, into an extruder wherein the polymer is melted so as to envelop particles of the powder component. The melt of resin encapsulated powder is then forced through an extruder die to form spaghetti-like strands. The strands may then be cut to form pellets in desired shapes and sizes as is known in the art. The resin encapsulated active components may then be mixed, as direct contact between the components is significantly reduced or substantially eliminated.

Polyethylene and polystyrene are suitable for use as a carrier resin for sodium borohydride. Polyethylene is useful to encapsulate the sodium bicarbonate/citric acid mix component and it is believed that polystyrene may also be used. Generally, the selection of a specific encapsulating polymer is not critical, however, it is likely that the polymer to be expanded will frequently also be used as the encapsulating polymer. For example, if polystyrene is desired to be expanded, polystyrene would preferably be used as the encapsulating polymer for the components of the chemical blowing agent composition.

According to one embodiment of the invention, sodium borohydride was encapsulated with polyethylene so that the sodium borohydride comprised about 10 wt % of the encapsulated form (pellets), sodium bicarbonate/citric acid mix was encapsulated with polyethylene so that the sodium bicarbonate/citric acid mix comprised about 50 wt % of the encapsulated form (pellets) and a mix of these pellets was prepared with half the pellets being polyethylene encapsulated sodium borohydride and the other half of the pellets being polyethylene encapsulated sodium bicarbonate/citric acid mix. A chemical blowing agent composition of such pellets can then be mre conveniently stored and/or used.

Referring to equations (1) and (2), above, the water produced during the decomposition reaction between citric acid and sodium bicarbonate reacts with the sodium borohydride and thereby activates the sodium borohydride, preventing the water from causing pitting or rusting of the contact surfaces, e.g., the mold surfaces which frequently are of ferrous metal. The activation system of sodium bicarbonate/citric acid mix has a relatively high gas production efficiency because it not only activates sodium borohydride to produce hydrogen gas, but reacts with citric acid to generate gas, e.g., $CO_2$. Further, sodium bicarbonate is believed to act as a nucleating agent to assist in the formation of small cells, while the citric acid component in the chemical blowing agent composition serves to speed the reaction between the sodium borohydride and water. As a further benefit of the invention, the sodium borohydride byproducts, e.g., sodium metaborate, act to help neutralize the acid and thereby eliminate another possible source of pitting. Thus, corrosion of the mold element is significantly reduced or substantially eliminated.

In this approach to molded foam articles, a sodium borohydride concentrate, made from sodium borohydride available from many sources including Morton Thiokol, Inc., Ventron Division (Danvers, Mass.) and a sodium bicarbonate/citric acid mix, exemplified by the proprietary compound manufactured by Boerhringer Ingelheim and distributed by Henley & Company, Inc. of New York, N.Y. under the trademark "HYDROCEROL COMPOUND" are used. In the literature, "HYDROCEROL-COMPOUND" is referred to as an equimolar mixture of acid and carbonate components, however, it is believed that this compound is more approximately an equigravimetric mix comprising about 45 wt % citric acid, 45 wt % sodium bicarbonate and 10 wt % beeswax.

The use of "HYDROCEROL-COMPOUND" carbonate/acid mix in a ratio of no more than about 8 parts by weight of active components, i.e., sodium bicarbonate/citric acid in the case of the activation system, per part by weight of sodium borohydride is preferred with a ratio of about 5 parts by weight of active components per part by weight of sodium borohydride being especially preferred.

In generaly, the concentration of sodium borohydride used in a mixture of sodium bicarbonate/citric acid mix and the polymer to be foamed may be in the range of about 0.01–5.0 wt %, with a range of about 0.1–0.3 wt % being highly preferred. Generally, about 0.2–3 parts by weight of the carrier encapsulated sodium borohydride and the carrier encapsulated sodium bicarbonate/citric acid mix are present per 100 parts by weight of the polymer resin to be foamed, with a concentration of about 2 parts by weight of the carrier encapsulated sodium borohydride and the carrier encapsulated sodium bicarbonate/citric acid mix per 100 parts by weight of the polymer resin being preferred. Lesser or greater concentrations may be used but such changes in concentration will have corresponding effects both on the efficiency and the economics of the use of such chemical blowing agent mixtures in the preparation of foam injection molded articles.

Such chemical blowing agent compositions have been effective in preparing injection molded structural foam such as molded foam articles having densities of at least about 25 lbs/ft$^3$.

The foregoing detailed description is given for clearness of understanding only, and no unnecessary limitations should be understood therefrom, as modifications within the scope of the invention will be obvious to those skilled in the art.

We claim:

1. A method of making a foam injection molded article, said method comprising the steps of:
    dispersing into a polymer resin (a) an effective amount of a primary chemical blowing agent comprising sodium borohydride and (b) an activation system comprising a first mixture of effective amounts of sodium bicarbonate and citric acid, to form a second mixture of said resin, primary chemical blowing agent and activation system, said sodium borohydride and said activation system being isolated from direct contact with each other until gas production is desired;
    heating said second mixture whereby said activation system releases water and said sodium borohydride reacts with said water to produce hydrogen gas; and
    subsequently injecting said second mixture into a mold obtaining expansion of said polymer resin into a molded foam article.

2. The method of claim 1 wherein said first mixture comprises an approximately equimolar mixture of said citric acid and sodium bicarbonate.

3. The method of claim 1 wherein no more than about 8 parts by weight of said first mixture are present per part by weight of said sodium borohydride.

4. The method of claim 3 wherein about 5 parts by weight of said first mixture are present per part by weight of said sodium borohydride.

5. The method of claim 1 wherein said sodium borohydride comprises about 0.01–5 wt % of said second mixture.

6. The method of claim 5 wherein said sodium borohydride dispersed in said polymer resin comprises about 0.1–0.3 wt % of said second mixture.

7. The method of claim 1 wherein said sodium borohydride and said first mixture are each encapsulated in a carrier resin prior to heating.

8. The method of claim 7 wherein said carrier resin is a polymer selected from the group consisting of polyethylene, polystyrene and polypropylene.

9. The method of claim 8 wherein said sodium borohydride comprises approximately 10 wt % of said polymer encapsulated sodium borohydride.

10. The method of claim 8 wherein said sodium bicarbonate and citric acid comprise approximately 50 wt % of said polymer encapsulated first mixture.

11. The method of claim 7 wherein about 0.2 to about 3 parts by weight of said carrier encapsulated sodium borohydride and said carrier encapsulated first mixture are present per 100 parts by weight of said polymer resin.

12. The method of claim 11 wherein about 2 parts by weight of said carrier encapsulated sodium borohydride and said carrier encapsulated first mixture are present per 100 parts by weight of said polymer resin.

13. The method of claim 1 wherein said mold comprises a material which undergoes corrosive reactions when subjected to an aqueous acidic environment.

14. The method of claim 13 wherein said material comprises a ferrous metal.

15. The method of claim 1 wherein said molded foam article has a density of at least about 25 lbs/ft$^3$.

16. A method of making a foam injection molded article, said method comprising the steps of:
    dispersing into a polymer resin to be foamed (a) an effective amount of a primary chemical blowing agent consisting essentially of sodium borohydride and (b) no more than about 8 parts by weight, per part by weight of said sodium borohydride, of an activation system comprising a first mixture of effective amounts of sodium bicarbonate and citric acid, to form a second mixture of said resin, sodium borohydride and activation system with said sodium borohydride comprising about 0.01–5 weight percent of said second mixture, said sodium borohydride and said activation system being isolated from direct contact with each other until gas production is desired;
    heating said second mixture whereby said activation system releases water and said sodium borohydride reacts with said water to produce hydrogen gas; and
    subsequently injecting said second mixture into a mold obtaining expansion of said polymer resin into a molded foam article.

17. The method of claim 16 wherein said first mixture comprises an approximately equimolar mixture of said citric acid and sodium bicarbonate.

18. The method of claim 16 wherein about 5 parts by weight of said first mixture are present per part by weight of said sodium borohydride.

19. The method of claim 16 wherein said sodium borohydride comprises about 0.1–0.3 weight percent of said second mixture.

20. The method of claim 16 wherein said sodium borohydride and said first mixture are each encapsulated in a carrier resin prior to heating.

21. The method of claim 20 wherein said carrier resin is a polymer selected from the group consisting of polyethylene, polystyrene, and polypropylene.

22. The method of claim 21 wherein said sodium borohydride comprises approximately 10 weight percent of said polymer encapsulated sodium borohydride.

23. The method of claim 21 wherein said sodium bicarbonate and citric acid comprise approximately 50 weight percent of said polymer encapsulated first mixture.

24. The method of claim 20 wherein from about 0.2 to about 3 parts by weight of said carrier resin encapsulated sodium borohydride and carrier resin encapsulated first mixture are present per 100 parts by weight of said polymer resin.

25. The method of claim 24 wherein about 2 parts by weight of said carrier resin encapsulated sodium borohydride and said carrier resin encapsulated first mixture are present per 100 parts by weight of said polymer resin.

26. The method of claim 16 wherein said mold comprises a material which undergoes corrosive reactions when subjected to an aqueous acidic environment.

27. The method of claim 26 wherein said material comprises a ferrous metal.

28. The method of claim 16 wherein said molded foam article has a density of at least about 25 lbs/ft$^3$.

* * * * *